(12) United States Patent
Gulwani et al.

(10) Patent No.: US 8,271,404 B2
(45) Date of Patent: Sep. 18, 2012

(54) TEMPLATE BASED APPROACH TO DISCOVERING DISJUNCTIVE AND QUANTIFIED INVARIANTS OVER PREDICATE ABSTRACTION

(75) Inventors: Sumit Gulwani, Redmond, WA (US); Ramarathnam Venkatesan, Redmond, WA (US); Saurabh Srivastava, Baltimore, MD (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 12/244,674

(22) Filed: Oct. 2, 2008

(65) Prior Publication Data

US 2010/0088548 A1    Apr. 8, 2010

(51) Int. Cl.
*G06F 15/18* (2006.01)
(52) U.S. Cl. .......................................................... 706/12
(58) Field of Classification Search .................... 706/12, 706/45
See application file for complete search history.

(56) References Cited

U.S. PATENT DOCUMENTS

| | | | |
|---|---|---|---|
| 6,343,372 B1 | 1/2002 | Felty et al. | |
| 2005/0229044 A1 | 10/2005 | Ball | |
| 2007/0005633 A1 | 1/2007 | Ball et al. | |
| 2007/0245329 A1 | 10/2007 | Sankaranarayanan et al. | |
| 2008/0172650 A1 | 7/2008 | Gulwani et al. | |

OTHER PUBLICATIONS

Gulwani et al., Constraint-Based Approach for Analysis of Hybrid Systems, Jul. 2008, LNCS 5123, pp. 190-203.*

Beyer, et al, "Invariant Synthesis for Combined Theories", retrieved at <<http://www.cs.sfu.ca/~dbeyer/Publications/2007-VMCAI.Invariant_Synthesis_for_Combined_Theories.pdf>>, Springer-Verlag, 2007, pp. 378-394.

Beyer, et al, "Path Invariants", retrieved at <<http://www.cs.sfu.ca/~dbeyer/Publications/2007—PLDI.Path_Invariants.pdf>>, ACM, Jun. 11-13, 2007, pp. 300-309.

Burnett, et al, "End-User Software Engineeiring with Assertions in the Spreadsheet Paradigm", retrieved at <<ftp://ftp.cs.orst.edu/pub/burnett/icse03-assertions.pdf>>, International Conference on Software Engineering, May 2003, pp. 1-11.

Clarke, et al, "Checking Consistency of C and Verilog using Predicate Abstraction and Induction", retrieved at <<http://reports-archive.adm.cs.cmu.edu/anon/2004/CMU-CS-04-131.pdf>>, School of Computer Science, Carnegie Mellon University, Jun. 25, 2004, pp. 1-14.

Clarke, "Counterexample-Guided Abstraction Refinement", retrieved at <<http://csdl2.computer.org/comp/proceedings/time-ictl/2003/1912/00/19120007.pdf>>, IEEE, 2003, pp. 1-2.

(Continued)

*Primary Examiner* — David Vincent
(74) *Attorney, Agent, or Firm* — Lee & Hayes, PLLC

(57) ABSTRACT

Techniques are disclosed for generating complex invariants in a program using a Satisfiability Modulo Theories (SMT) solver. In one embodiment, the generated invariants may be used to validate assert statements in a program. Additionally or alternatively, a weakest pre-condition invariant may be generated such that parameters passed to the program that satisfy the weakest pre-condition are guaranteed to satisfy the program's assert statements. Additionally or alternatively, a strongest post-condition may be generated, determining what is guaranteed to be true about the state of the program upon completion of the program. In one embodiment, the SMT solver generates invariants by mapping predicates onto unknown variables in a template. The template may comprise unknown variables related by logical structures defined with disjunctions, universal quantifiers, and existential quantifiers. The predicates may comprise equalities and inequalities between program variables.

20 Claims, 14 Drawing Sheets

OTHER PUBLICATIONS

Clarke, et al, "SAT-Based Predicate Abstraction of Programs", retrieved at <<http://www.sei.cmu.edu/pub/documents/05.reports/pdf/05tr006.pdf>>, Predictable Assembly from Certifiable Components Initiative, Sep. 2005, pp. i-vi, 1-39.

Colon, et al, "Linear Invariant Generation Using Non-Linear Constraint Solving", retrieved at <<http://www.springerlink.com/content/pjyw2mf4jryl5n0p/fulltext.pdf>>, Springer-Verlag, 2003, pp. 420-432.

Das, "Predicate Abstraction", retrieved at <<http://chicory.stanford.edu/PAPERS/SatyakiThesis.ps>>, Dec. 2003, pp. 1-103.

de Moura, et al, "Efficient E-Matching for SMT Solvers", retrieved at <<http://research.microsoft.com/projects/z3/cade07-slides.pdf>>, Microsoft Research, p. 1-22.

Graf, "Construction of Abstract State Graphs with PVS", retrieved at <<http://www.springerlink.com/content/5q28n34l501514m5/fulltext.pdf>>, VERIMAG, pp. 72-83.

Gulavani, et al, "Counterexample Driven Refinement for Abstract Interpretation", retrieved at <<ftp://ftp.research.microsoft.com/pub/tr/TR-2006-02.pdf>>, Microsoft Research, Jan. 2006, pp. 1-18.

Gulwani, et al, "Program Verification as Probabilistic Inference", retrieved at <<o:\docs\MS1\3805US\EV1060.PDF>>, ACM, Jan. 17-19, 2007, pp. 1-13.

Kapur, "Automatically Generating Loop Invariants Using Quantifier Elimination", retrieved at <<http://drops.dagstuhl.de/opus/volltexte/2006/511/pdf/05431.KapurDeepak.Paper.511.pdf>>, Dagstuhl Seminar Proceedings 05431, pp. 1-17.

Mcmillan, "Applications of Craig Interpolants in Model Checking", retrieved at <<http://www.springerlink.com/content/89tjyar2u05eedu7/fulltext.pdf>>, Springer-Verlag, 2005, pp. 1-12.

Muller-Olm, et al, "Interprocedural Analysis (Almost) for Free", retrieved at <<http://cs.uni-muenster.de/sev/publications/tr-do790.ps.gz>>, Universitat Dortmund, pp. 1-15.

Podelski, et al, "A Complete Method for the Synthesis of Linear Ranking Functions", retrieved at <<http://www.springerlink.com/content/0fc8ewqwcexp3yh9/fulltext.pdf>>, Springer-Verlag, 2004, pp. 239-251.

Rodriguez-Carbonell, et al, "Automatic Generation of Polynomial Loop Invariants: Algebraic Foundations", retrieved at <<http://www.lsi.upc.edu/~erodri/webpage/papers/issac04.pdf>>, pp. 1-9.

Sankaranayanan, et al, "Constraint-Based Linear-Relations Analysis", retrieved at <<http://www.springerlink.com/content/vcml0p9lx0pqfcdp/fulltext.pdf>>, Springer-Verlag, 2004, pp. 53-68.

Sankaranarayanan, et al, "Non-Linear Loop Invariant Generation using Grobner Bases", retrieved at <<http://delivery.acm.org/10.1145/970000/964028/p318-sankaranarayanan.pdf?key1=964028&key2=3156657121&coll=GUIDE&dl=GUIDE&CFID=80437091&CFTOKEN=92274650>>, ACM, 2004, pp. 318-329.

Sankaranarayanan, et al "Scalable Analysis of Linear Systems Using Mathematical Programming", retrieved at <<http://www.springerlink.com/content/x2g04came7mdkd72/fulltext.pdf>>, Springer-Verlag, 2005, pp. 25-41.

Sankaranarayanan, et al, "Static Analysis in Disjunctive Numerical Domains", retrieved at <<http://www.springerlink.com/content/h6q48155v133h276/fulltext.pdf>>, Springer-Verlag, 2006, pp. 3-17.

Seidl, et al, "Interprocedurally Analysing Linear Inequality Relations", retrieved at <<http://www.springerlink.com/content/p244540563468j76/fulltext.pdf>>, Springer-Verlag, 2007, pp. 284-299.

* cited by examiner

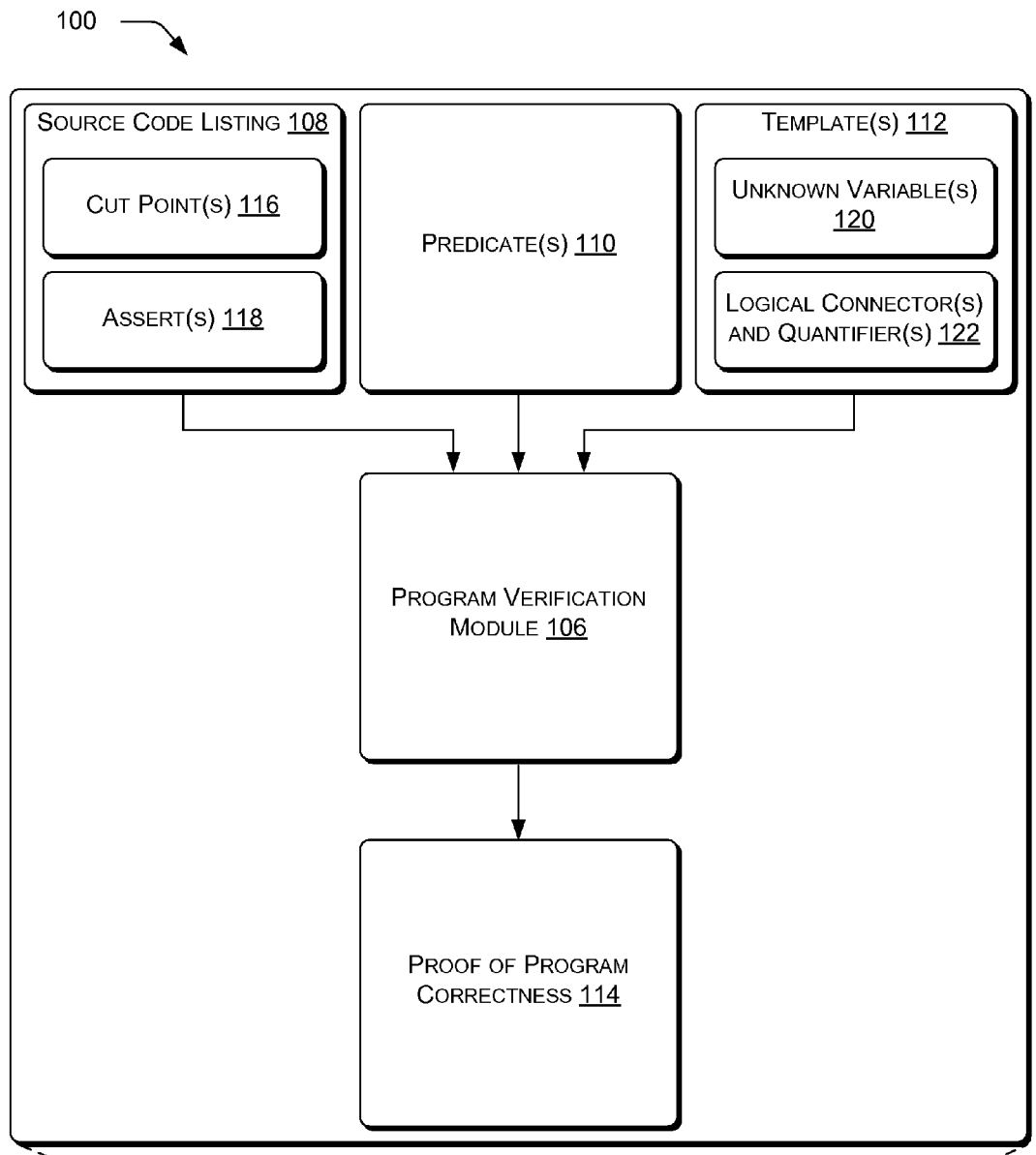
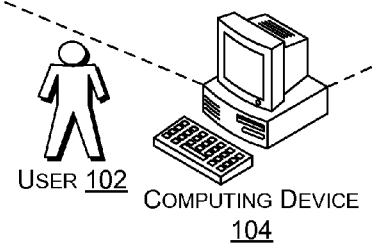
FIG. 1

200

SOURCE CODE LISTING 108

Array Init (int* A, int η)
1    i := 0;
2    while (i < η)
3        A[i] := 0;
4        i := i + 1;
5    Assert($\forall j : 0 \leq j < \eta \Rightarrow$ select (A, j) = 0);

PREDICATES 110

202 $\{v1 \leq v2 \mid v1, v2 \in V\}$
204 $\{j < v, j \leq v, j > v, j \geq v \Rightarrow \mid v \in V\}$

TEMPLATES 112

Unknown Variables 120

Unknown variables $v_1, \ldots, v_5$

LOGICAL CONNECTORS AND QUANTIFIERS 122

$T ::= v \mid \neg T \mid T_1 \vee T_2 \mid T_1 \wedge T_2 \mid \exists x : T \mid \forall x : T$

PROGRAM VERIFICATION MODULE 106

- OPTIMAL SOLUTION GENERATOR 302
- SATISFIABILITY MODULO THEORIES (SMT) SOLVER 304
- LEAST FIXED POINT COMPUTATION MODULE 306
- GREATEST FIXED POINT COMPUTATION MODULE 308

OPTIMALSOLUTIONS IMPLEMENTATION 402

OptimalSolutions($\Phi$,Q)
1  Let $U^+(\Phi)$ be $\{p_1, .., p_a\}$.
1  Let $U^-(\Phi)$ be $\{\eta_1, .., \eta_b\}$.
3  S:= 0;
4  foreach $(q_1, .., q_a) \in Q(p_1) \times .. \times Q(p_a)$:
5      $\Phi' := \Phi[p_i \rightarrow \{q_i\}]_i$;
6      T := OptimalNegativeSolutions($\Phi'$,Q);
7      S := S U $\{\sigma \mid \sigma(p_i) = \{q_i\}, \sigma(\eta_i) = t(\eta_i), t \in T\}$;
8  R:= $\{$MakeOptimal $(\sigma,S) \mid \sigma \in S\}$;
9  while any change in R:
10     foreach $\sigma_1, \sigma_2 \in R$
11         $\sigma := $ Merge$(\sigma_1,\sigma_2)$; if $(\sigma = \bot)$ continue;
12         if $\land \sigma' \in R$: $^a\land_{i=1} \sigma'(p_i) \land {}^b\land_{i=1} \sigma(\eta_i) \Rightarrow \sigma'(\eta_i)$
13             R:= R U $\{$MakeOptimal $(\sigma,S)\}$;
14 return R;

MakeOptimal($\sigma$,S)
1  T := $\{\sigma' \mid \sigma' \in S \land {}^b\land_{i=1} \sigma(\eta_i) \Rightarrow \sigma'(\eta_i)\}$
2  foreach $\sigma' \in T$:
3      $\sigma'' := $ Merge$(\sigma,\sigma',S)$
4      if $(\sigma'' \neq \bot) \sigma = \sigma''$;
5  return $\sigma$ Merge $(\sigma_1,\sigma_2,S)$
1  Let $\sigma$ be s.t. $\sigma(p_i) = \sigma_1(p_i)$ U $\sigma_2(p_i)$ for i = 1 to a
2           and $\sigma(\eta_i) = \sigma_1(\eta_i)$ U $\sigma_2(\eta_i)$ for i = 1 to b
3  T := $\{\sigma' \mid \sigma' \in S \land {}^b\land_{i=1} \sigma(\eta_i) \Rightarrow \sigma'(\eta_i)\}$
4  if $\land \quad \exists \sigma' \in T$ s.t. $^a\land_{i=1} \sigma'(p_i) = \{q_i\}$
   return $\sigma \quad q_1 \in \sigma(p_1), .., q_a \in \sigma(p_a)$
5  else return $\bot$

FIG. 4a

LEAST FIXED POINT COMPUTATION IMPLEMENTATION 404
LeastFixedPointSome(Prog, Q)
1  Let $\sigma_0$ be s.t. $\sigma_0(\upsilon) \rightarrow 0$, if $\upsilon$ is negative
              $\sigma_0(\upsilon) \rightarrow Q(\upsilon)$, if $\upsilon$ is positive
2  S:= $\{\sigma_0\}$;
3  while $S \neq 0 \wedge \forall \sigma \in S: \neg Valid(VC(Prog, \sigma))$
4      Choose $\sigma \in S$, $(\delta, T_1, T_2, \sigma_t, \sigma_f) \in Paths(Prog))$ s.t.
              $\neg Valid(VC((T_1\sigma, \delta, T_2\sigma\sigma_t)))$
5      S := S – $\{\sigma\}$;
6      Let $\sigma_P = \sigma \mid_{Unknown\sigma(Prog)-Unknown\sigma(T2)}$.
7      S := S U $\{\sigma'\ \sigma_f\ U\ \sigma_p \mid_{\sigma''\wedge \in S}\ T_2\sigma'' => T_2\sigma'\sigma_f\ \wedge$
              $\sigma' \in OptimalSolutions(VC((T_1\sigma, \delta, T_2)), Q\sigma_t)\}$
8  if $S = 0$ return "No solution"
9  else return $\sigma \in S$ s.t. Valid (VC(Prog, $\sigma$))

GREATEST FIXED POINT COMPUTATION IMPLEMENTATION 406
1  Let $\sigma_0$ be s.t. $\sigma_0(\upsilon) \rightarrow Q(\upsilon)$, if $\upsilon$ is negative
              $\sigma_0(\upsilon) \rightarrow 0$, if $\upsilon$ is positive
2  S := $\{\sigma_0\}$;
3  while $S \neq 0 \wedge \forall \sigma \in S : \neg Valid(VC(Prog, \sigma))$
4      Choose $\sigma \in S$, $(\delta, T_1, T_2, \sigma_t, \sigma_f) \in Paths(Prog)$ s.t.
              $\neg Valid(VC((T_1\sigma, \delta, T_2\sigma\sigma_t)))\}$
5      S:= S-$\{\sigma\}$;
6      Let $\sigma_p = \sigma \mid_{Unknown\sigma(Prog)-Unknown\sigma(T2)}$.
7      S:= SU $\{\sigma'\ U\ \sigma_p \mid_{\sigma''\wedge \in S}\ T_1\sigma' \not=> T_1\sigma''\ \wedge$
              $\sigma' \in OptimalSolutions(VC((T_1, \delta, T_2\sigma\sigma_t)), Q)\}$
8  if $S = 0$ return "No solution"
9  else return $\sigma \in S$ s.t. Valid(VC(Prog, Q))

CONSTRAINT SOLVING MODULE 504

OPTIMALLY WEAK SOLUTION IMPLEMENTATION 602

OptimallyWeakSolutions(Prog)

```
1    Φ := Φ_Prog;
2    S := Φ;
3    while SAT(Φ)
4        Φ' := Φ;
5        while SAT(Φ')
6            s := SAT(Φ');
7            Φ' := Φ ∧ Boolify((T_e s => T_e) ∧ ¬(T_e => T_e s))
8            S := S ∪ {σ};
9        Φ := Φ ∧ ¬Boolify(T_e => T_e s)
10   return S;
```

OPTIMALLY STRONG SOLUTION IMPLEMENTATION 604

OptimallyStrongSolutions(Prog)

```
1    Φ := Φ_Prog;
2    S := Φ;
3    while SAT(Φ)
4        Φ' := Φ;
5        while SAT(Φ')
6            s := SAT(Φ');
7            Φ' := Φ ∧ Boolify((T_e s => T_e) ∧ ¬(T_e => T_e s))
8            S := S ∪ {σ};
9        Φ := Φ ∧ ¬Boolify(T_e => T_e s)
10   return S;
```

WEAKEST PRECONDITION GENERATION MODULE 702

GreatestFixedPointAll(Prog)

1    Let $\sigma_0$ be s.t. $\sigma_0(\upsilon) \rightarrow Q(\upsilon)$, if $\upsilon$ is negative
                $\sigma_0(\upsilon) \rightarrow 0$, if $\upsilon$ is positive 2    S := $\{\sigma_0\}$;
3    while S ≠ 0 ∧ ∃ $\sigma$ ∈ S : ¬Valid(VC(Prog, $\sigma$))
4        Choose $\sigma$ ∈ S, ($\delta$, $T_1$, $T_2$, $\sigma_t$, $\sigma_f$) ∈ Paths(Prog) s.t
                 ¬Valid(VC($T_1$, $T_2$, $\sigma_t$, $\sigma_f$)))}

5    S := S − {$\sigma$};
6    LET $\sigma_p$ = $\sigma$ | Unknowns(Prog) − Unknowns($T_1$) ·
7    S := S ∪ {$\sigma'$ ∪ $\sigma_p$ | $_{\sigma''\in S}$ $T_1,\sigma'$ ≠> $T_1$, $\sigma''$ ∧
               $\sigma'$ ∈ OptimalSolutions(VC(($T_1$, $\delta$, $T_2\sigma\sigma_t$)), Q)
8    return S;

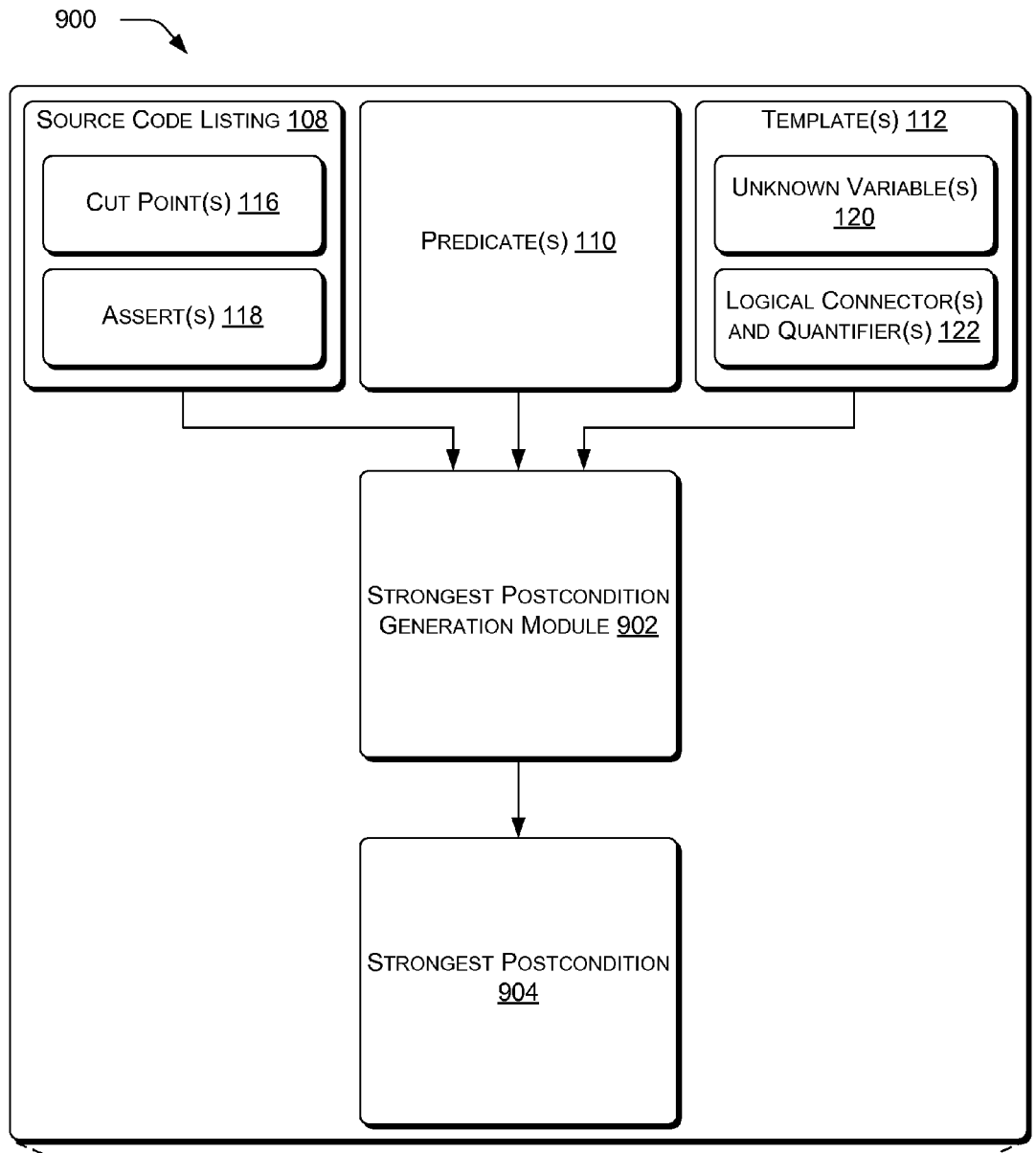
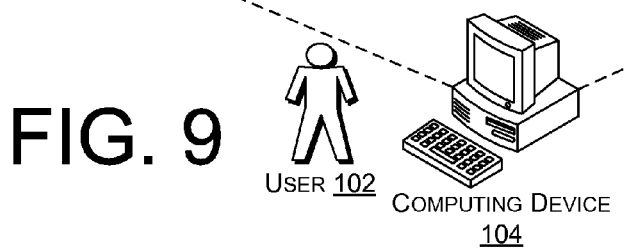
FIG. 9

TEMPLATE BASED APPROACH TO DISCOVERING DISJUNCTIVE AND QUANTIFIED INVARIANTS OVER PREDICATE ABSTRACTION

BACKGROUND

Computer software development has proven a challenging engineering task. Computer software may require millions of hours to develop, costing billions of dollars. Despite these efforts, program errors, or bugs, are inevitably introduced into computer code during software development. In fact, many software development companies employ software testers whose sole purpose is to identify and catalogue these program errors. Unfortunately, manual software testing performed by human software testers is expensive, and only results in the testing of code paths that are actually executed by the software testers.

In addition to manual testing, software engineers attempt to identify program errors by including tests in the program code itself. One technique is to define invariant conditions that should always be true at a given point in the program code. If an invariant condition is ever false, then a program error exists. During testing and debugging phases of software development (that is, before the software has been distributed to end users), the use of invariant conditions within program code may enable testers and developers to identify program errors that would otherwise go undetected.

In practice, program invariants are defined by assert statements that contain programming expressions. Other types of program invariants, such as assume statements, are similarly used. The programming expressions may comprise functions and variables defined in the program and, as such, the assert statements may directly investigate the state of the program. At runtime these assert statements are evaluated in the context of the code as it is executing. While assert statements may validate the state of the program every time the program is executed, assert statements only validate expressions in the context of the code paths that are actually executed. Code paths that are not executed are not validated by assert statements, and therefore may contain program errors. These program errors may then manifest themselves when a customer invokes an untested code path, leading to data corruption or data loss.

SUMMARY

Techniques are described for generating and verifying program invariants. In one embodiment, software programs are analyzed to statically verify program invariants. Additionally or alternatively, software programs are analyzed to determine a smallest number of preconditions that, when adhered to by parameters of the program, guarantee all the invariants defined in the program are valid. Software programs may also be analyzed to determine all that can be known about the state of the program upon completed execution of the program.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), and/or computer-readable instructions as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIG. 1 depicts an illustrative architecture for attempting to verify a program by generating a proof of program correctness.

FIG. 2 depicts an illustrative source code listing and illustrative predicate and template definitions.

FIG. 3 depicts an illustrative program verification module.

FIG. 4 depicts illustrative algorithms for finding an optimal solution of a template.

FIG. 6 depicts an illustrative constraint solving module for generating a weakest precondition and a strongest postcondition of a program.

FIG. 8 depicts an illustrative greatest fixed-point based weakest precondition generation module.

FIG. 9 depicts an illustrative architecture for generating a strongest postcondition of a program.

DETAILED DESCRIPTION

Figure 5:
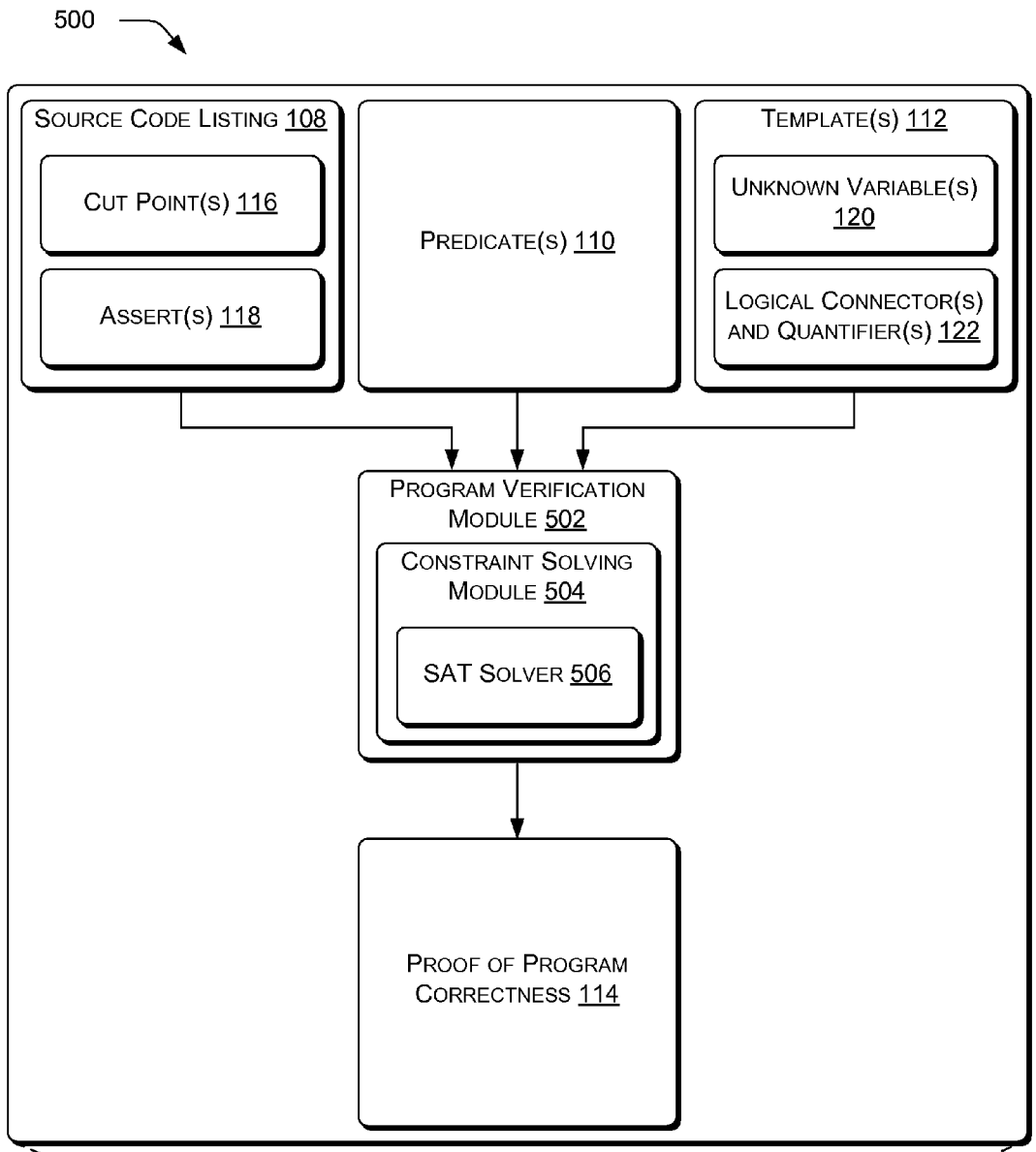
FIG. 5 depicts an illustrative architecture for generating a proof of program correctness with a constraint-based technique.

Detecting program errors in computer software is of paramount importance to ensure data integrity, user satisfaction, and enhanced productivity. Many methods have been contemplated to discover program errors, including static source code analysis, manual runtime testing, automated runtime testing, and end-user error reports. One method is to analyze invariant conditions. An invariant condition is a condition that should evaluate to true, or else an error is present in the program. Typically, invariant conditions are inserted into a program by the program's developer, often in the form of assert statements. Assert statements comprise a condition defined with variables used by the program, and optionally a message to be displayed when the condition evaluates to false. Assert statements are generally evaluated during program execution, in sequence with the surrounding code, and typically only when executing a "debug build" of the application.

In one embodiment described herein, a program verification module statically analyzes a program's source code to determine whether assert statements will always evaluate to true. By performing a static analysis, the program verification module is not limited to testing the code paths that happen to be executed by manual or automated runtime testing. The program verification module may utilize an SMT solver to prove, given a set of predicate conditions and a template or outline of the proof, that the condition of an assert statements will evaluate to true. If it can be proven, the program verification module may present the proof to the user. If, however, the program verification module cannot prove that the assert will always evaluate to true, then the assert may evaluate to true in some conditions but evaluate to false in others.

It is not always possible to prove the validity of the asserts contained in the program. There may be a subset of all possible input variable combinations for which validity of an assertion cannot be proven. In such cases, it would be beneficial to identify preconditions to the program such that by adhering to the preconditions, an assert is guaranteed to evaluate to true.

Alternatively or additionally, a program may be verified by determining known facts about the program at various cut-points throughout the code. For example, if a program variable X is initialized to 0, and it can be shown that the program variable X is only incremented (and never decremented), one fact about the program is that X is always greater than or equal to 0. In one embodiment, all of the facts that are known about a program at the end of that program constitute a strongest postcondition. A strongest postcondition may be used to statically validate an assert, or alternatively to discover facts guaranteed to be true about a program, and present those facts to a user. In addition to enhancing general understanding of the code, a strongest postcondition enables the user to identify by inspection unexpected facts about the program, including program errors. The user may choose to formally codify facts about the program in an assert statement, so that subsequent modifications of the program do not unexpectedly alter program behavior.

FIG. 1 depicts an illustrative architecture for verifying a program by generating a proof of program correctness. In one embodiment, a user 102 operating a computing device 104 may execute a program verification module 106. The program verification module 106 may detect potential program errors by analyzing an assert statement inserted by a software developer into a source code listing 108. In one embodiment the user 102 may be the software developer who developed the source code listing 108, or the user 102 may be a software tester whose job it is to test a program generated from the source code listing 108.

If a potential program error is detected, then a program compiled from the source code listing 108 may exhibit erratic behavior, crash, or even lose data. If, however, the assert statement can be proven to be true over all possible program inputs, the developer can know with certainty that the assert is true over all code paths. This is of great benefit, as manual testing and automated testing are inherently limited to the code paths executed during testing.

In one embodiment, the analysis of the source code listing 108 is performed statically on source code. Other contemplated methods include detecting program errors in a compiled version of the source code listing 108, detecting program errors as the compiled version of the source code listing 108 is executed, and/or detecting program errors as the source code listing 108 is interpreted or executed by a virtual machine.

In one embodiment, the user 102 or another entity (e.g., a developer) supplies a set of predicates 110 and one or more templates 112 to the program verification module 106. The program verification module may generate a proof of program correctness by mapping one or more of the set of predicates 110 onto the one or more templates 112. In one embodiment, the invariant conditions may be used to prove assertions defined in the source code listing 108.

As illustrated, the source code listing 108 may comprise one or more cut-points 116 and an assert 118. The cut-points 116, together comprising a cut-set, comprise a collection of program locations such that every cyclic loop in the program passes through some cut-point. As such, a program with no branching does not contain a cut-point, while a program comprising a while-loop comprises at least one cut-point associated with the while-loop. For simplicity of discussion, we assume, without loss of any generality, that the cut-points 116 also includes the program entry and exit locations.

In one embodiment, a straight-line path of program statements δ between two cut-points $\tau_1$ and $\tau_2$ is verified. The program statements may be converted into Static Single Assignment (SSA) form before verification. The verification condition (VC) is given by:

$$VC(\tau_1, \delta, \tau_2) = \pi \Rightarrow WP(\delta, \tau_2)$$

Where the weakest precondition WP(δ, φ) of formula φ with respect to the path δ is as follows:

$$WP(\text{skip}, \phi) = \phi$$

$$WP(s_1, s_2, \phi) = WP(s_1, WP(s_2, \phi))$$

$$WP(\text{assert}(\phi'), \phi) = \phi' \wedge \phi$$

$$WP(\text{assume}(\phi'), \phi) = \phi' \Rightarrow \phi$$

$$WP(x_1 = e, \phi) = (x = e) \Rightarrow \phi$$

Let Paths(prog) denote the set of all tuples $(\delta, \tau_1, \tau_2, \sigma_t, \sigma_f)$, where δ comprises a straight-line path of program statements in SSA form between two of the cut-points 116 labeled with templates $\tau_1$ and $\tau_2$ in Program prog. $\sigma_t$ maps the initial version of the SSA variables to the final version of the SSA variables for the path δ, while $\sigma_f$ maps the final versions of the SSA variables to the initial version of the SSA variables for the path δ. Then the verification condition (VC) of the Program prog, given a mapping σ of the unknowns in the templates to one or more predicates, comprises:

$$VC(Prog, \sigma) = \bigwedge_{(\delta, \tau_1, \tau_2, \sigma_t, \sigma_f) \in Paths(Prog)} VC((\tau_1 \sigma, \delta, \tau_2 \sigma \sigma_t))$$

The assert 118 may comprise an expression defined with program variables, the expression typically evaluating to true or false. Although asserts are traditionally evaluated at run-time in the context of an executing program, the program verification module 106 attempts to prove the validity of the assert 118 through static analysis of the source code listing 108.

Each of the templates 112 may comprise one or more unknown variables 120 and a set of logical connectors and quantifiers 122. The unknown variables 120 are related by the set of logical connectors and quantifiers 122, together comprising a logical expression in terms of unknown variables 120 of arbitrary complexity. In one embodiment, the program verification module 106 generates invariants over program variables by selectively mapping one or more of the predicates 110 onto each of the one or more variables 120. In one embodiment, a single predicate 110 is mapped onto each of the unknown variables 120. Alternatively or additionally, a conjunction of predicates 110 may be mapped onto an unknown variable 120.

In one embodiment the program verification module 106 generates invariants for each cut-point 116 of the source code 108. An invariant represents what is known to be true about the state of the program at that cut-point. A mapping of predicates 110 to unknown variables 120 of each invariant template is sought such that the resulting invariants form a valid proof of correctness of the asserts 118.

FIG. 2 depicts an illustrative source code listing and illustrative predicate and template definitions. The source code listing 108 is one example of a program that can be analyzed by the program verification module 106. The program comprises a function ArrayInit(int* A, int n). The cut-set for the function comprises program location 2, "while (i<n)", as well as the entry and exit points. During the analysis, one or more paths are defined over the source code, each path comprising a straight-line path between two cut points. In this instance, there are three code paths. The first code path comprises the entry point of the program up to and including program location 2, where the program location denotes the program point immediately before the statement corresponding to the program location. The second code path comprises the body of the while loop (program locations 2-4). The third code path comprises the program body between cut-point 2 and the assert at program location 5. The program verification module 106 may utilize cut-points 116 and paths between the cut-points 116 to generate invariants that form a valid proof of correctness.

The user 102 may supply the predicates 110 to the program verification module 106. In one embodiment, the user 102 manually generates the set of predicates 110. Additionally or alternatively, a heuristic may be used to generate predicates based on the variables present in the source code listing 108. In one embodiment, a predicate 202 relates two program variables defined in the source code listing 108. The relationship may comprise an inequality, inclusive or exclusive, or an equality relationship. Non-limiting examples of the predicate 202 include x<y, i<=n, and m=n.

A predicate 204 may also be defined as a relationship between a program variable and a constant value. The relationship between the program variable and the constant value may also be an inequality, inclusive or exclusive, or an equality. Non-limiting examples of a predicate 204 include x<0, y>=1, and n=10.

The unknown variables 120 may comprise a single unknown variable v, or a plurality of unknown variables $v_1 \ldots v_5$. A single unknown variable v may have a conjunction of one or more predicates 110 mapped to it, allowing for complex invariants to be defined from a template 112 comprising a single variable.

The logical connectors and quantifiers 122, meanwhile, enable one or more unknown variables 120 to be related in a logical structure. In one embodiment, unknown variables 120 may be related by a disjunction. Additionally or alternatively, an existential or universal quantifier may be used with an unknown variable 120 to define a more complex relationship. One example of an invariant template comprising a universal quantifier is $\forall j: v \Rightarrow select(A,j)=0$ (for all j, v implies that the value of the array A at index j equals 0). Also, the template 112 may comprise a negated unknown variable 120.

While it is semantically correct for a template 112 to include a conjunction of unknown variables 120, such a relationship between unknown variables 120 may be redundant, because a conjunction of multiple unknown variables 120 can be represented by a conjunction of predicates 110 mapped to a single unknown variable 120.

FIG. 3 depicts an illustrative program verification module. The program verification module 106 may in one embodiment comprise an optimal solution generator 302. The optimal solution generator 302 comprises a procedure that takes as input the template 112 with unknown variables 120 v1 . . . vc, where each unknown variable vi is either a positive unknown or a negative unknown. The optimal solution generator 302 may return a set of optimal solutions that map predicates 110 onto the unknown variables 120 of the template 112.

An unknown 120 in an invariant template 112 is said to be a positive unknown if conjoining additional predicates 110 to any mapping/solution for the unknown variable strengthens the template invariant. A stronger invariant is an invariant that is more difficult to prove true. One example of a positive unknown is the unknown v in the template that is simply "v". By adding predicates 110 to the unknown variable v, there are more constraints that must be met before v can be proven true.

On the other hand, an unknown 120 in an invariant template 112 is said to be a negative unknown if conjoining additional predicates 110 to any mapping/solution for the unknown variable weakens the invariant. A weaker invariant is an invariant that is easier to prove true. For instance, the unknown v in the template "$\neg v$"(not v) comprises a negative unknown, because conjoining additional predicates 110 to v weakens the formula "$\neg$". Another example of a negative unknown is the unknown v in the template "v=>A[x]=0" (if v, then array A at index x equals 0).

In one embodiment, the optimal solution generator 302 utilizes a Satisfiability Modulo Theories (SMT) solver 304 to map the predicates 110 to the unknown variables 120. This mapping, if successful, forms an invariant constituting a valid proof of program correctness 114. In one embodiment, the SMT solver 304 may comprise a procedure called OptimalNegativeSolutions(phi, Q), where phi comprises a template 112 with negative unknowns, and Q comprises a map that maps each unknown variable 120 to a set of possible predicates 110. The map of some subset of predicates 110 to the unknown variables 120 comprises a solution if phi is valid when each unknown variable 120 is replaced by a conjunction of the predicates from the corresponding subset to which it is mapped to. The map comprises an optimal solution if deletion of any predicate results in a map that is no longer a solution for phi.

For example, consider the following phi with one negative unknown v: (x<=n) and v=>(y=n). Let the set of predicates 110 comprise the set of all inequality relationships between the variables x, y, n, from which a substitution into the negative unknown v is made. There are two optimal solutions for the negative unknown v: {(y<=n), (y>=n)} and {(x>=n), (x<=y), (y<=x)}. The first optimal solution immediately implies y=n, and so the invariant phi is valid. The second optimal solution can be thought of as equating x and n, and then x and y. By the transitive property, y=n, and the invariant is valid.

A least fixed point computation module 306 and a greatest fixed point computation module 308 each implement an iterative approach for discovering the required inductive invariants for program verification. The iterative technique involves maintaining a set of candidate-solutions at each step until any candidate-solution becomes a solution. A candidate-solution comprises a map that maps the unknown variables 120 in all templates in the program to some subset of the predicates 110. Each iteration selects a candidate-solution, which is not a valid solution, and updates it by generating a set of point-wise weaker or stronger candidate solutions (point-wise weaker for the least fixed point computation module 306 and stronger for the greatest fixed point computation module 308).

Both the least fixed point computation module 306 and the greatest fixed point computation module 308 utilize a function OptimalSolutions(phi). OptimalSolutions takes as input a formula with unknown variables 120, where each unknown variable can be positive or negative. OptimalSolutions returns a set of optimal solutions. In one embodiment, OptimalSolutions may be implemented using OptimalNegaiveSolutions.

The least fixed point computation module 306 is initialized with a candidate solution that maps each negative unknown to the empty set, and each positive unknown to the set of all predicates. The candidate solutions are updated by removing/adding predicates from the positive/negative unknowns until an optimal solution is found.

The greatest fixed point computation module 308 comprises the dual of the least fixed point computation module 306. The greatest fixed point computation module 308 begins with a candidate solution that maps each positive unknown to the empty set, and each negative unknown to the set of all predicates 110. The candidate solutions are updated by adding/removing predicates from the positive/negative unknowns until an optimal solution is found.

FIG. 4 depicts illustrative algorithms for finding an optimal solution of a template. Specifically, an optimalsolutions implementation 402 depicts one illustrative algorithm implemented by the optimal solution generator 302.

Similarly, a least fixed point computation implementation 404 illustrates an algorithm implemented in the least fixed point computation module 306, and a greatest fixed point computation implementation 406 illustrates an algorithm implemented in the greatest fixed point computation module 308.

FIG. 5 depicts an illustrative architecture for generating a proof of program correctness with a constraint-based technique. A program verification module 502 receives the source code listing 108, the predicates 110, and the templates 112 as described with respect to the program verification module 106 of FIG. 1. The program verification module 502 also generates the proof of program correctness 114, or if program correctness cannot be proven an indication as such.

The program verification module 502 comprises a constraint solving module 504. The constraint solving module 504 encodes the verification condition of the program as a Boolean formula psi such that a satisfying assignment to psi produces the required inductive invariants for program verification. For every unknown variable $v_i$ 120 and every predicate q in the predicates 110, a Boolean variable $b_q^{v_i}$ is introduced to denote whether or not the predicate q is present for that unknown variable $v_i$ 120 in the solution. In one embodiment, the constraint solving module 504 generates psi by making at least one call to the theorem proving interface OptimalNegativeSolutions of the SMT solver 304. The verification condition of the entire program comprises the conjunction of the verification condition of all paths between two cut-points, each of which may be generated by invoking OptimalNegativeSolutions.

Once the verification of the entire program is encoded in a Boolean formula, a SAT solver 506 may attempt to solve the Boolean formula, generating the mapping of predicates 110 to unknown variables 120 such that the program is valid.

In one embodiment, given a mapping of unknown variables 120 $v_i$ to predicates $Q_i$, let Boolean Constraint (BC) of the mapping denote the Boolean formula that constrains the unknown variable $v_i$ to contain all predicates from $Q_i$:

$$BC(\{v_i \mapsto Q_i\}_i) = \bigwedge_{i, q \in Q_i} b_q^{v_i}$$

In one embodiment, the Boolean constraint is encoded as follows. First, the Boolean constraint $\psi_{\delta,\tau_1,\tau_2}$ is generated to encode the verification condition corresponding to any tuple $(\delta, \tau_1, \tau_2, \sigma_t, \sigma_f) \in \text{Paths}(\text{Prog})$. Let $\tau'_2$ be the template obtained from $\tau_2$ in which the unknown variables have been renamed to fresh unknown variables and let 'orig' denote the reverse mapping that maps the fresh unknown variables back to the original unknown variables. (We do this renaming to ensure that each occurrence of an unknown variable in the formula $VC(<\tau_1, \delta, \tau'_2>)$ is unique). Note that each occurrence of an unknown variable in the formula $VC(<\tau_1, \delta, \tau_2>)$ is not unique when $\tau_1$ and $\tau_2$ refer to the same template, which is the case when the path 6 goes around an inner-most loop).

Let $p_1, \ldots, p_a$ be the set of positive variables and let $\eta_1, \ldots, \eta_b$ be the set of negative variables in $VC(<\tau_1, \delta, \tau'_2>)$. Consider any tuple $(q_1, \ldots, q_a) \in Q'(p_1) \times \ldots \times Q'(p_a)$, where Q' is the map that maps an unknown v that occurs in $\tau_1$ to Q(v) and an un-known v that occurs in $\tau_2$ to $Q(v)\sigma_1$. Consider the partial map $\sigma_{q_1, \ldots, qa} = \{p_i \rightarrow \{q_i\}\}_i$ that maps each positive variable $p_i$ to the singleton set $\{q_i\}$. Let $S_{\delta,\tau_1,\tau_2}^{q_1, \ldots, qa}$ be the set of optimal solutions returned after invoking the procedure OptimalNegativeSolutions on the formula $VC(<\tau_1, \delta, \tau'_2>)\sigma_{q_1, \ldots, qa}$ as below:

$$S_{\delta,\tau_1,\tau_2}^{q_1, \ldots, qa} = \text{OptimalNegativeSolutions}(VC((\tau_1,\delta,\tau'_2))\sigma_{q_1 \ldots qa}, Q')$$

The following Boolean formula $\psi_{\delta,\tau_1,\tau_2,\sigma_t,\sigma_f}$ encodes the verification condition corresponding to $(\delta, \tau_1, \tau_2, \sigma_t, \sigma_f)$:

$$\psi_{\delta,\tau_1,\tau_2,\sigma_t,\sigma_f} = \bigwedge_{q_1,\ldots,q_a \in Q'(p_1) \times \ldots Q'(p_a)} \left( BC(\{orig(p_i) \mapsto \{q_i\sigma_f\}\}_i) \Longrightarrow \bigvee_{\{\eta_i \mapsto Q_i\}_i \in S_{\delta,\tau_1,\tau_2}^{q_1,\ldots,q_a}} BC(\{orig(\eta_i) \mapsto Q_i\sigma_f\}_i) \right)$$

The verification condition of the entire program is now given by the following Boolean formula $\psi_{prog}$ that is the conjunction of the verification condition of all tuples $(\delta, \tau_1, \tau_2, \sigma_t, \sigma_f) \in \text{Paths}(\text{Prog})$:

$$\psi_{Prog} = \bigwedge_{(\delta,\tau_1,\tau_2,\sigma_t,\sigma_f) \in Paths(Prog)} \psi_{\delta,\tau_1,\tau_2,\sigma_t,\sigma_f}$$

In one embodiment, this condition comprises a SAT formula to be solved by the SAT solver 506.

Figure 7:
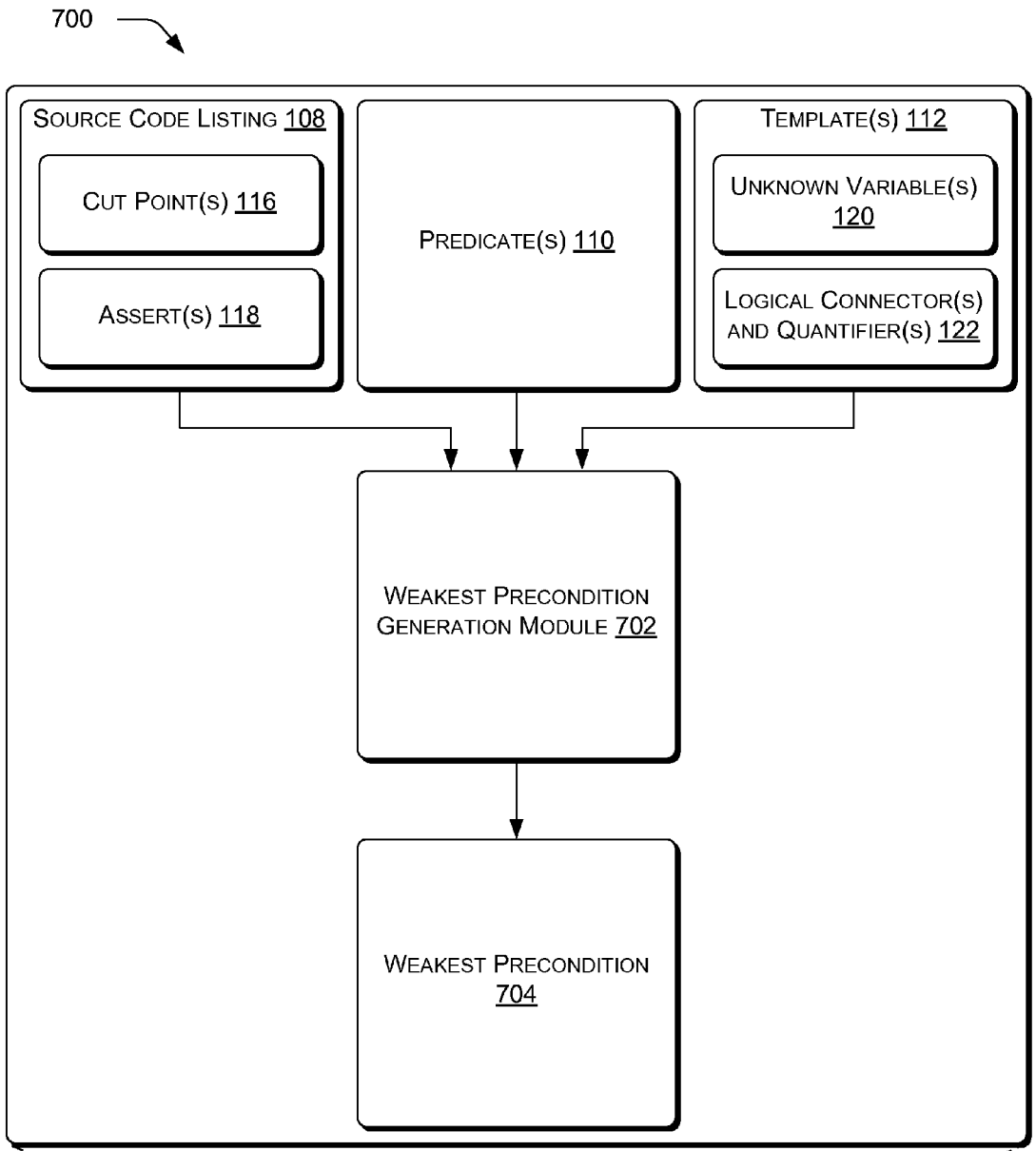
FIG. 7 depicts an illustrative architecture for generating a weakest precondition of a program.

FIG. 7 depicts an illustrative architecture for generating a weakest precondition of a program. A precondition may be generated when it cannot be proven that all of the asserts 118 in the source code listing 108 are valid. A weakest precondition comprises the simplest condition that can be put at the beginning of the program to ensure that the asserts 118 will be valid. If there are some inputs to the program that are invalid, but if the program avoids these inputs, then the program will be provably correct. A precondition may be used to add a check ensuring that any bad inputs are caught as soon as possible.

The weakest precondition of a program is a least restrictive precondition under which it is safe to call the program. If the unknown variables 120 in the precondition are positive, the weakest precondition typically has a small number of predicates 110. For negative unknown variables 120, the weakest precondition typically has a larger number of predicates 110. In one embodiment, adding an assert to the beginning of a program based on the weakest precondition formalizes what the developer of the program likely intended, but didn't take the time to formally encode in an assert.

The strongest (and also the simplest) pre-condition is a precondition that always evaluates to false. When a precondition evaluates to false, no inputs are valid, so the program is not run, and so none of the assertions fail. Hence, in order to be less restrictive, it is desirable to generate a weakest precondition (as opposed to any precondition). The notion of weakest precondition may not be that of an absolute one, but one that may be represented using the given template structure, and hence we also refer it to as an optimally-weak precondition since it is not unique. Both the fixed-point and the constraint based techniques can be extended to solve the weakest precondition problem.

The solution to the weakest precondition problem is a more powerful tool than verifying whether or not given assertions are valid. The verification problem of FIGS. 1 and 5 can be solved given a solution that calculates the weakest precondition. Note that the program will be provably correct when the weakest precondition imposes no limitation (that is, the precondition is "true").

A weakest precondition can be generated using both fixed point (e.g., greatest fixed point) and constraint-based techniques.

FIG. 6 depicts an illustrative environment 600 comprising an optimally weak solution implementation 602. The optimally weak solution implementation 602 comprises an extension of the constraint-based technique of FIG. 5 for generating a weakest postcondition. As is done for program verification, a weakest precondition is found by generating a Boolean formula that encodes the verification condition of the program, which now also includes a template at the beginning of the program. An additional constraint is added that the solution for the template at the beginning of the program is not stronger than any of the solutions already found. The constraint is iteratively evaluated until no weaker solution is determined. The solution to the template at the beginning of the program yields a weakest precondition. In one embodiment, the Boolify function reference in the optimally weak solution implementation 602 stands for $\psi_{\delta,\tau 1,\tau 2,\sigma t,\sigma f}$, where $\delta$="skip", $\tau_1$="true", $\tau_2$="$\phi$", and $\sigma_t$ and $\sigma_f$ are the identity maps.

The greatest fixed-point solution discussed above can also be extended to generate optimally-weak solutions. As above, a template is introduced at the beginning of the program. An optimal solution for the template at the beginning of the program yields an optimally-weak precondition.

FIG. 8 depicts an illustrative weakest precondition generation module. The weakest precondition generation module 702 comprises, in one embodiment, a GreatestFixedPointAll algorithm. The GreatestFixedPointAll algorithm, as described above with respect to FIG. 7, calculates all optimally-weak preconditions.

FIG. 9 depicts an illustrative architecture for generating a strongest postcondition of a program. The notion of strongest postcondition may not be that of an absolute one, but one that may be represented using the given template structure, and hence we may also refer it to as an optimally-strong postcondition since it is not unique. The strongest postcondition generation module 902 takes a program, without asserts, and determines what is true about the program at different program points, including the end of the program. The strongest postcondition is the dual of the weakest precondition. As with the weakest precondition, a solution that generates a strongest postcondition can be used to for program verification by checking to see if the facts of the program imply the assertions 118 or not.

Determining the strongest postcondition is useful for discovering facts about a program. For instance, facts about a program may be useful in performing compiler optimizations. E.g., if the compiler can prove that a certain condition will always be true, then the test of the condition can be removed, because the result of the condition will be known ahead of time.

In one embodiment, generating a strongest postcondition can be achieved with an adaptation of the greatest fixed point solution or an adaptation of the constraint-based solution, similar to the adaptations described above with regard to generating a weakest precondition.

The constraint-based technique of FIG. 5 may be extended to generate an optimally-strong postcondition. As is done for program verification, an optimally-strong postcondition is found by generating a Boolean formula that encodes the verification condition of the program, which may also include a template at the end of the program. An additional constraint is added such that the solution for the template at the end of the program is not weaker than any of the solutions already found. The constraint is iteratively evaluated until no stronger solution is determined. The solution to the template at the end of the program yields an optimally-strong postcondition. This process is illustrated in an optimally strong solution implementation 604 in FIG. 6.

The least fixed-point solution discussed above can be extended to generate optimally-strong postconditions. As above, a template is introduced at the end of the program. An optimal solution for the template at the end of the program yields an optimally-strong postcondition.

Figure 10:
FIG. 10 depicts an illustrative least fixed-point based strongest postcondition generation module.

FIG. 10 depicts an illustrative environment 1000 comprising the strongest postcondition generation module 902. The strongest postcondition generation module 902 comprises, in one embodiment, a LeastFixedPointAll algorithm. The LeastFixedPointAll algorithm, as described above with respect to FIG. 9, calculates all optimally-strong postconditions.

Illustrative Processes

Figure 11:
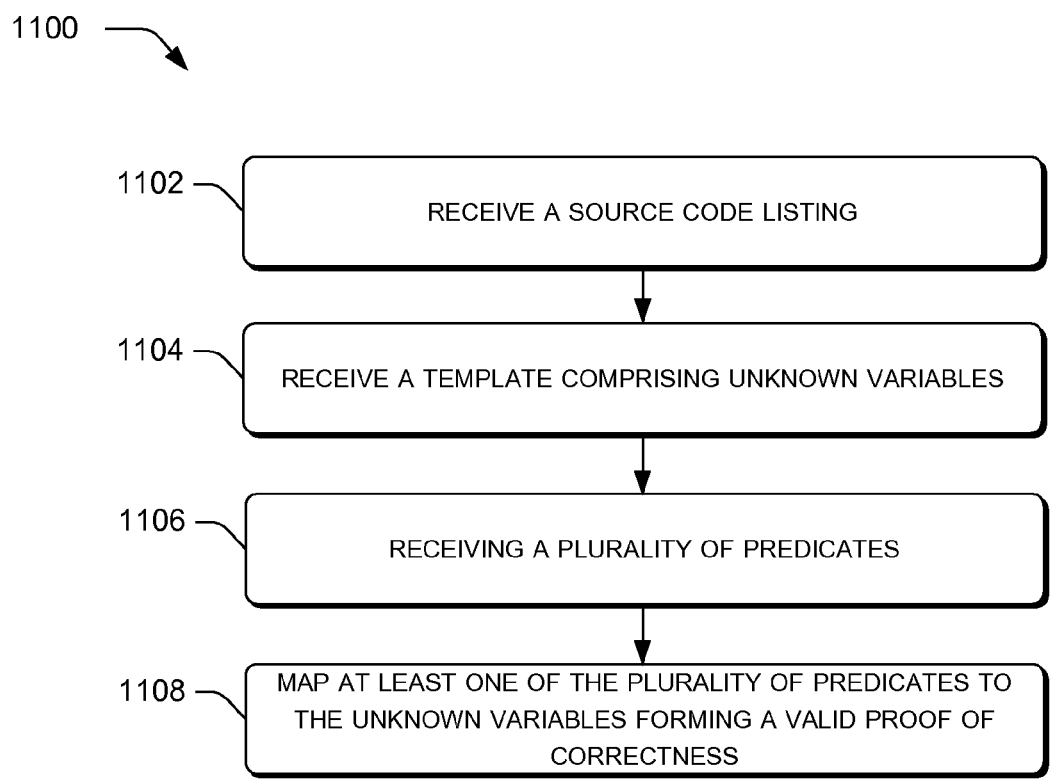
FIG. 11 depicts an illustrative process for generating a proof of correctness of a source code listing.

FIG. 11 depicts an illustrative process 1100 for generating a proof of correctness of a source code listing. This process, as well as other processes described throughout, is illustrated as a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At operation 1102, the program verification module 106 receives the source code listing 108 containing a cut-set of cut-points 116 and asserts 118. At operation 1104, the program verification module 106 receives a template comprising unknown variables. In one embodiment, the unknown variables are related by logical disjunctions, conjunctions, and negations. Additionally or alternatively, the unknown variables 120 may be subject to existential and/or universal quantifiers.

At operation 1106, the program verification module 106 receives a plurality of predicates 110. A predicate 110 may comprise a relationship between two program variables, the relationships including inclusive and exclusive inequalities, equalities, and any other binary operation.

At operation 1108, the program verification module 106 attempts to generate a proof of program correctness by mapping one or more predicates 110 onto each of the unknown variables 120. If the program verification module 106 does not find a proof, the user 102 may submit a different set of predicates or templates for evaluation.

Figure 12:
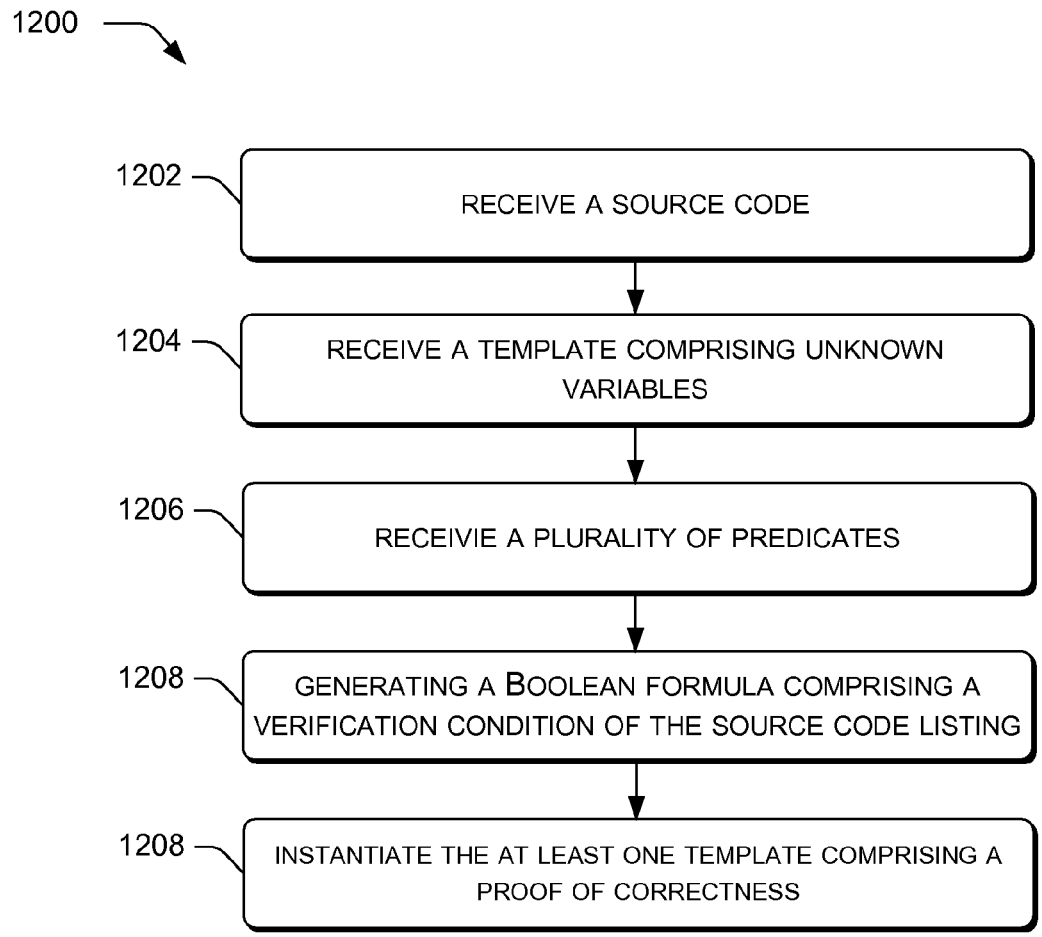
FIG. 12 depicts an illustrative process for generating a proof of correctness of a source code listing with a constraint-based method.

FIG. 12 depicts an illustrative process 1200 for generating a proof of correctness of a source code listing 108 with a constraint-based method. At operation 1202, the program verification module 502 receives the source code listing 108 containing a cut-set of cut-points 116 and asserts 118.

At operation 1204, the program verification module 502 receives a template comprising unknown variables. In one embodiment, the unknown variables are related by logical disjunctions, conjunctions, and negations. Additionally or alternatively, the unknown variables 120 may be subject to existential and/or universal quantifiers.

At operation 1206, the program verification module 502 receives a plurality of predicates. A predicate may comprise a relationship between two program variables, the relationships including inclusive and exclusive inequalities, equalities, and any other binary operation.

At operation 1208, the program verification module 502 generates a Boolean formula comprising a verification condition for all assertions in the received source code listing 108. In one embodiment, the SMT solver 304 generates the Boolean formula.

At operation 1210, the program verification module 502 solves the Boolean formula calculated in act 1208 with the SAT solver 506. Solving the Boolean formula indicates which of the predicates 110 map to which unknown variables 120, enabling the program verification module 502 to generate the proof of program correctness 114.

Figure 13:
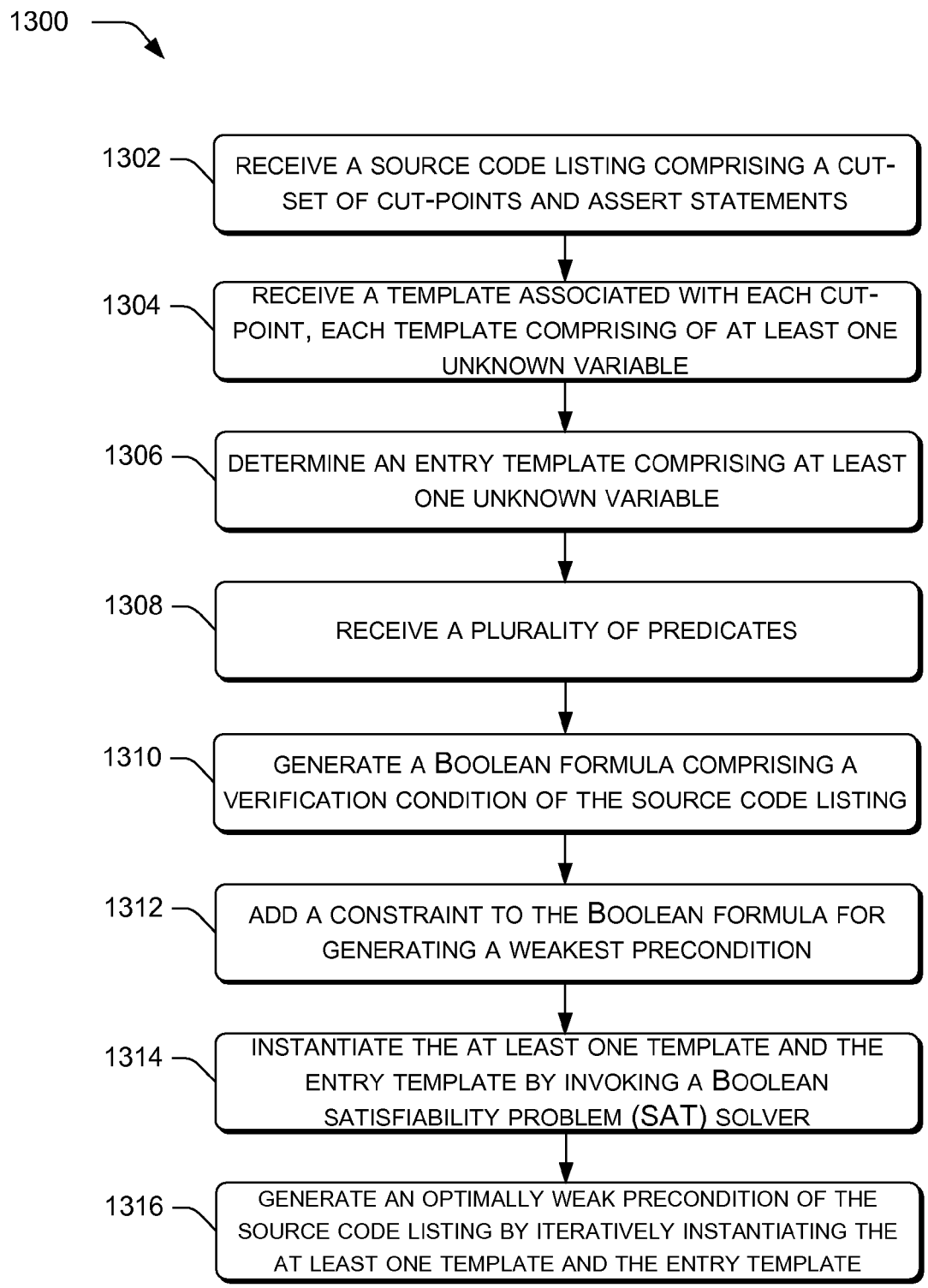
FIG. 13 depicts an illustrative process for generating an optimally weak precondition of a source code listing.

FIG. 13 depicts an illustrative process 1300 for generating an optimally weak precondition of a source code listing. At operation 1302, the program verification module 702 receives the source code listing 108 containing a cut-set of cut-points 116 and asserts 118.

At operation 1304, the program verification module 702 receives a template 112 comprising unknown variables 120 associated with the cut-points 116. In one embodiment, the unknown variables are related by logical disjunctions, conjunctions, and negations. Additionally or alternatively, the unknown variables 120 may be subject to existential and/or universal quantifiers.

At operation 1306, the program verification module 702 determines a template for the entry point to the source code listing 108. At operation 1308, the program verification module 702 receives a plurality of predicates 110. A predicate may comprise a relationship between two program variables, the relationships including inclusive and exclusive inequalities, equalities, and any other binary operations.

At operation 1310, the program verification module 702 generates a Boolean formula comprising a verification condition for all assertions in the received source code listing 108. In one embodiment, the SMT solver 304 generates the Boolean formula.

At operation 1312, the program verification module 702 adds a constraint to the Boolean formula calculated in act 1310 requiring that any solution to the formula be weaker than all previous solutions to the formula.

At operation 1314, the program verification module 702 solves the Boolean formula calculated in act 1310 and augmented in act 1312 with the SAT solver 506. Solving the Boolean formula generates the mapping between the predicates 110 and the unknown variables 120 of the entry point template created in act 1306.

At operation 1316, the program verification module 702 generates an optimally weak precondition of the source code listing 108 by iteratively solving the Boolean formula with the SAT solver 506, each iteration requiring the next solution to be weaker than all previous solutions.

Illustrative Processing Functionality

Figure 14:
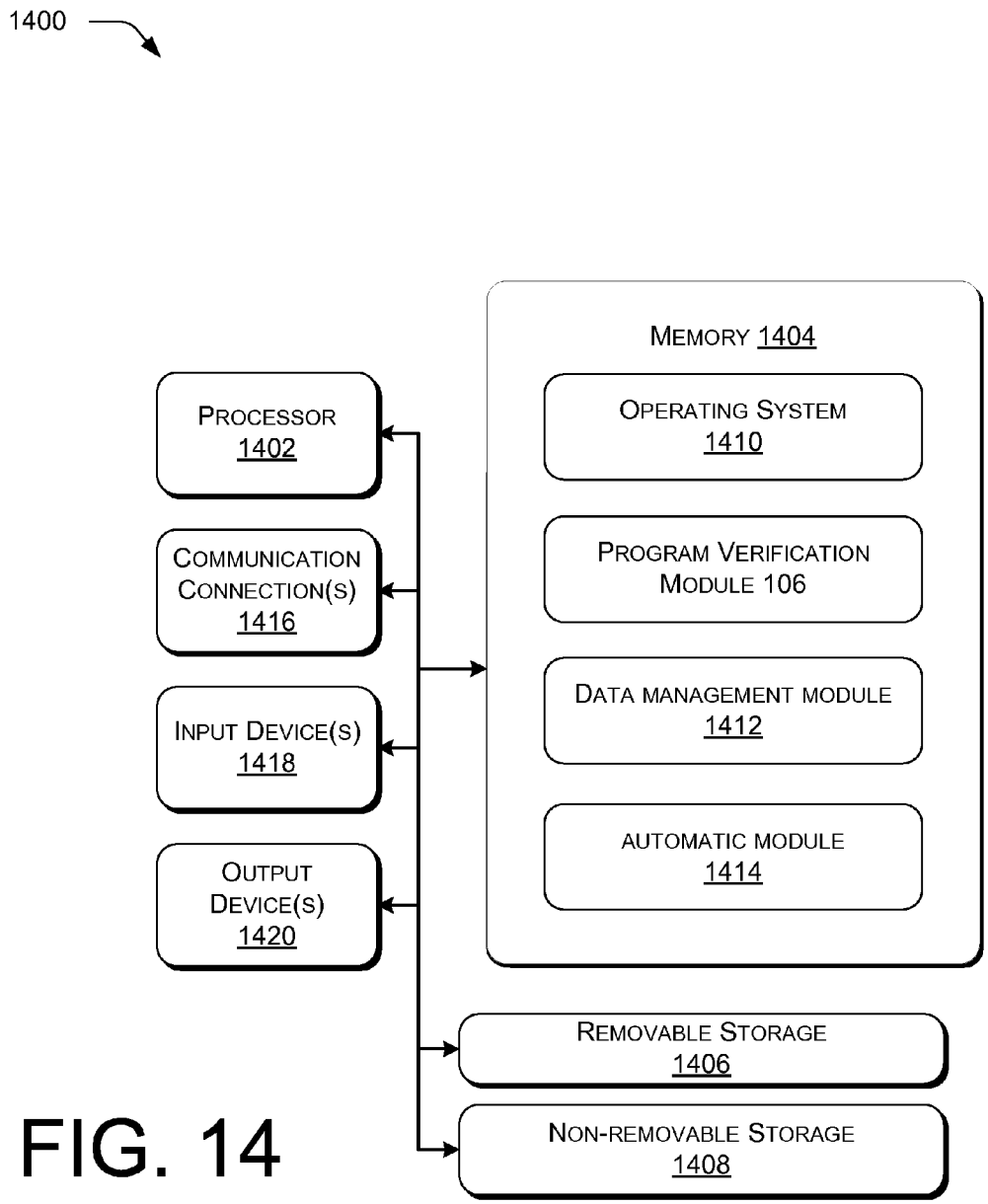
FIG. 14 depicts an illustrative processing functionality to store and execute a program verification module.

FIG. 14 illustrates an illustrative processing functionality 1400 to store and execute a program verification module 106. The program verification module 106 determines whether a program is valid by statically analyzing invariant conditions encoded in the program. The program is valid when all of the invariant conditions can be shown to be true. The processing functionality 1400 may be configured as any suitable computing device or server capable of implementing the program verification module 106. In one illustrative configuration, the processing functionality 1400 comprises at least one processing unit 1402 and memory 1404. The processing unit 1402 may be implemented as appropriate in hardware, software, firmware, or combinations thereof. Software or firmware implementations of the processing unit 1402 may include computer- or machine-executable instructions written in any suitable programming language to perform the various functions described.

Memory 1404 may store programs of instructions that are loadable and executable on the processor 1402, as well as data generated during the execution of these programs. Depending on the configuration and type of computing device, memory 1404 may be volatile (such as RAM) and/or non-volatile (such as ROM, flash memory, etc.). The computing device or server may also include additional removable storage 1406 and/or non-removable storage 1408 including, but not limited to, magnetic storage, optical disks, and/or tape storage. The disk drives and their associated computer-readable media may provide non-volatile storage of computer readable instructions, data structures, program modules, and other data for the computing devices.

Memory 1404, removable storage 1406, and non-removable storage 1408 are all examples of computer storage media. Computer storage media includes volatile and non-volatile, removable and non-removable media implemented in any method or technology for storage of information such as computer readable instructions, data structures, program modules or other data. Memory 1404, removable storage 1406, and non-removable storage 1408 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the server or other computing device.

Turning to the contents of the memory 1404 in more detail, the memory 1404 may include an operating system 1410 and one or more application programs or service for representing and evaluating isogenies, which may be of a large prime degree. In one implementation, the memory 1404 includes a data management module 1412 and an automatic module 1414. The data management module 1412 includes but is not limited to identifying and tracking a session. The automatic module 1414 stores and manages information, such as session identifier, session state, computing devices of the user, and the like, and may communicate with one or more local and/or remote databases or services.

The memory 1404 further includes a user interface module 1416 and a session module 1418. The user interface module 1416 presents the user with the user interface to log in or log off, in and out of a session, and the like. The session module 1418 includes but is not limited to, tracking a state of the computing devices, logging in or logging off, connecting or disconnecting, and the like. The session module 1418 performs connections, disconnections, search functions, such as performing searches to identify the client devices that are logged on, logged off, state of the client devices, the status of the user, and the like.

The processing functionality 1400 may also contain communications connection(s) 1416 that allow the processing functionality 1400 to communicate with a stored database, another computing device or server, the user terminals, and/or other devices on the network. Communications connection(s) 1416 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 1400 may also include input device(s) 1418 such as a keyboard, mouse, pen, voice input device, touch input device, etc., and output device(s) 820, such as a display, speakers, printer, etc. The processing functionality 1400 may include a database hosted on the processing functionality 1400 including, but is not limited to, session data, network addresses, list of computing devices, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as illustrative forms of implementing the claimed subject matter. For example, the methodological acts need not be performed in the order or combinations described herein, and may be performed in any combination of one or more acts.

CONCLUSION

Although illustrative systems and methods have been described in language specific to structural features and/or methodological acts, it is to be understood that the subject matter defined in the appended claims is not necessarily limited to the specific features or acts described. Rather, the specific features and acts are disclosed as illustrative forms of implementing the claimed methods, devices, systems, etc.

What is claimed is:

1. A method comprising:
   receiving a source code listing comprising a cut-point and an assert statement;
   receiving an invariant template associated with the cut-point, the template comprising an unknown variable;
   receiving a plurality of predicates; and
   mapping, with a Satisfiability Modulo Theories (SMT) solver, at least one of the plurality of predicates to the unknown variable such that the resulting invariant forms a valid proof of correctness of the assert statement.

2. The method of claim 1, wherein the template further comprises a disjunction of unknown variables.

3. The method of claim 1, wherein the template further comprises an unknown variable associated with an existential quantifier or a universal quantifier.

4. The method of claim 1, wherein the plurality of predicates comprises inequality relationships between program variables defined in the source code listing.

5. The method of claim 1, wherein one of the plurality of predicates comprises an inequality relationship between a pair of program variables defined in the source code listing.

6. The method of claim 1, wherein one of the plurality of predicates comprises an inequality relationship between a program variable defined in the source code listing and a numeric constant.

7. The method of claim 1 wherein the mapping comprises:
   generating a strongest proof of correctness with a least fixed point analysis of the source code listing.

8. The method of claim 7, wherein the source code listing comprises an end point, the source code listing is associated with a program, the program having an end, and further comprising:
   generating a strongest postcondition invariant at the end point of the source code listing that is guaranteed to be true at the end of the program.

9. The method of claim 8, further comprising:
   generating an optimally-strong postcondition invariant by introducing a template with unknown variables at an end of the source code listing.

10. The method of claim 1, wherein the mapping comprises:
    generating a weakest proof of correctness with a greatest fixed point analysis of the source code listing.

11. The method of claim 10, further comprising:
    generating a weakest precondition which, when satisfied, ensures that the assert statement is true.

12. The method of claim 11, further comprising:
    generating an optimally-weak precondition with a template having unknown variables at a program entry location.

13. The method of claim 1, wherein the template comprises a plurality of unknown variables related to each other with logical quantifiers, and wherein the mapping comprises mapping a conjunction of predicates to each of the plurality of unknown variables.

14. One or more computer-readable media storing computer-executable instructions that, when executed on one or more processors, perform acts comprising:
    receiving a source code listing comprising a cut-point and an assert statement;
    receiving an invariant template associated with the cut-point, the template comprising at least one unknown variable;
    receiving a plurality of predicates;
    generating, with a Satisfiability Modulo Theories (SMT) solver, a Boolean formula comprising a verification condition of the source code listing, the Boolean formula comprising a Boolean variable for each combination of predicate and unknown variable; and
    instantiating the at least one template by invoking a Boolean satisfiability problem (SAT) solver to determine for each of the at least one unknown variable a subset of the plurality of predicates such that the instantiated template comprises a proof of correctness of the assert statement.

15. One or more computer-readable media as recited in claim 14, further storing computer-executable instructions that, when executed on the one or more processors, perform acts comprising:
    determining an entry template comprising at least one unknown variable, the entry template representing what must be true at an entry point of the source code listing for the assert to be valid;

adding a constraint to the Boolean formula such that the entry template must be strictly weaker than any previous instantiations of the entry template; and generating an optimally-weak precondition of the source code listing by iteratively instantiating the entry template.

16. One or more computer-readable media as recited in claim 15, wherein the weakest precondition comprises an invariant that, when adhered to, guarantees that the assert statement will always evaluate to true without adding unnecessary conditions.

17. One or more computer-readable media as recited in claim 14, further storing computer-executable instructions that, when executed on the one or more processors, perform an act comprising:

determining an end template comprising at least one unknown variable, the end template representing what is known at an end point of the source code listing;

adding a constraint to the Boolean formula such that the end template is strictly stronger than any previous instantiations of the end template; and generating an optimally-strong postcondition of the source code listing by iteratively instantiating the end template.

18. One or more computer-readable media as recited in claim 17, wherein the strongest postcondition comprises an invariant that is guaranteed to be true at the end of execution, the invariant including all predicates that can be proven to be true.

19. A system comprising:

one or processors; and one or more computer readable media comprising computer-executable instructions that, when executed by the one or more processors, perform acts comprising:

receiving a source code listing comprising a cut-point and an assert statement;

receiving an invariant template associated with the cut-point, the template comprising at least one unknown variable;

determining an entry template comprising at least one unknown variable, the entry template representing the entry point of the source code listing;

receiving a plurality of predicates;

generating, with a Satisfiability Modulo Theories (SMT) solver, a Boolean formula comprising a verification condition of the source code listing, the Boolean formula comprising a Boolean variable for each combination of predicate and unknown variable;

adding a constraint to the Boolean formula for generating an optimally-weak precondition by requiring that the entry template must be strictly weaker than any previous instantiations of the entry template;

instantiating the at least one template and the entry template by invoking a Boolean satisfiability problem (SAT) solver to simultaneously identify for each unknown variable of each template a subset of the plurality of predicates, such that the assert statement is known to be true when the instantiation of the entry template is adhered to; and generating an optimally weak precondition of the source code listing by iteratively instantiating the at least one template and the entry template.

20. The system of claim 19, wherein the at least one template and the entry template comprises a plurality of unknown variables related by logical quantifiers.

* * * * *